US010698929B2

(12) United States Patent
Pfeifle

(10) Patent No.: US 10,698,929 B2
(45) Date of Patent: Jun. 30, 2020

(54) UPDATING SINGLE REGIONS OF A NAVIGATIONAL DATABASE

(71) Applicant: HERE GLOBAL B.V., Eindhoven (NL)

(72) Inventor: Martin Pfeifle, Seewald (DE)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 15/315,995

(22) PCT Filed: May 27, 2015

(86) PCT No.: PCT/IB2015/053986
§ 371 (c)(1),
(2) Date: Dec. 2, 2016

(87) PCT Pub. No.: WO2015/186025
PCT Pub. Date: Dec. 10, 2015

(65) Prior Publication Data
US 2017/0097943 A1    Apr. 6, 2017

(30) Foreign Application Priority Data

Jun. 3, 2014 (GB) .................. 1409817.2

(51) Int. Cl.
G01C 21/34    (2006.01)
G08G 1/123    (2006.01)
G06F 16/29    (2019.01)
G06F 16/23    (2019.01)
G01C 21/32    (2006.01)

(52) U.S. Cl.
CPC ............ G06F 16/29 (2019.01); G01C 21/32 (2013.01); G01C 21/34 (2013.01); G06F 16/2379 (2019.01)

(58) Field of Classification Search
None
See application file for complete search history.

(56) References Cited

U.S. PATENT DOCUMENTS

2011/0040479 A1* 2/2011 Uyama .................. G01C 21/32
701/533
2013/0117322 A1* 5/2013 Fischer .................. G01C 21/32
707/792
2014/0101151 A1 4/2014 Fischer et al.

FOREIGN PATENT DOCUMENTS

CN    102016500 A    4/2011
CN    103090876 A    5/2013
CN    103514185 A    1/2014
(Continued)

OTHER PUBLICATIONS

International Search Report and Written Opinion from International Application No. PCT/IB2015/053986 dated Aug. 20, 2015.
(Continued)

Primary Examiner — Anne Marie Antonucci
(74) Attorney, Agent, or Firm — Alston & Bird LLP

(57) ABSTRACT

A method for producing an update package for a navigational database comprises: —providing a first update region of the navigational database, and —providing a first gateway table of the first update region such that the first gateway table associates each gateway of the first update region with said first update region and with at least one other update region.

15 Claims, 8 Drawing Sheets

(56) References Cited

FOREIGN PATENT DOCUMENTS

| | | |
|---|---|---|
| CN | 103714103 A | 4/2014 |
| EP | 2 717 015 A1 | 4/2014 |
| EP | 2717015 A1 * | 4/2014 ............. G01C 21/32 |

OTHER PUBLICATIONS

Office Action for European Application No. EP 15 727 733.6 dated Aug. 10, 2018, 6 pages.
Office Action for Chinese Application No. 201580027920.5 dated Aug. 19, 2019, 8 pages.
Navigation Data Standard, Format Specification, NDS Version 2.3.1 (Preliminary Release) (2013) 457 pages.
Navigation Data Standard, Update Specification, NDS Version 2.3.1 (Preliminary Release) (2013) 78 pages.
Office Action for Chinese Application No. 201580027920.5 dated Dec. 27, 2018, 20 pages.
Communication Regarding Oral Proceedings for European Application No. 15727733.6 dated Mar. 4, 2020, 5 pages.

* cited by examiner

United States Patent US 10,698,929 B2

UPDATING SINGLE REGIONS OF A NAVIGATIONAL DATABASE

FIELD

Some embodiments may relate to providing an update package for a navigational database.

BACKGROUND

A navigation device may be configured utilize a navigational database e.g. for calculating a route from a first location of a first region to a second location of a second region, e.g. for finding a route from Paris to Munich. The navigational database may comprise a global gateway table, which contains a list of gateways connecting adjacent update regions, and said table may associate each gateway with several update regions. The data size of the navigational database may be large, and the navigational database may be updated partially so that only one update region is modified. The partial updating may comprise downloading an update package from a server, or using an update package stored on an update medium (e.g. flash memory).

The navigational database may comprise a global gateway table, which may associate each gateway of the navigational database with an update region and with a geographical tile. The same gateway may occur in several different geographical tiles although said gateway may represent only one physical location. For example, a gateway may occur in two different layers and in two different update regions, and said gateway may occur four times in the global gateway table. The global gateway table may be updated e.g. by SQL commands when a certain update region is incrementally updated, in order to keep the global gateway table and the content of the update regions are synchronized. SQL means structured Query Language.

A navigational database for Europe may comprise e.g. 12 different update regions. Partial updating of the navigational database may comprise selecting one or more update regions from $2^{12}$ different combinations of update regions. Consequently, $2^{12}$ different versions of the global gateway table would be needed to match with each possible combination. A global gateway table matching with a given selection may be determined by using SQL commands, but the high number of possible alternatives may make it impractical to store the global gateway table(s) as predetermined downloadable data.

SUMMARY

Some versions may relate to updating a navigational database. Some versions may relate to a method for providing an update package for a navigational database. Some versions may relate to an apparatus for providing an update package for a navigational database. Some versions may relate to a computer program for providing an update package for a navigational database. Some versions may relate to a data structure comprising an update package. Some versions may relate to a method of using a navigational database. Some versions may relate to calculating a route by using an update package. Some versions may relate to an apparatus for calculating a route by using an update package.

According to a first aspect, there is provided a method comprising:
  providing a first update region (RID1) of a navigational database (NDS), and
  providing a first gateway table (RTAB1) of the first update region (RID1) such that the first gateway table (RTAB1) associates each gateway (GID1, GID2, GID15) of the first update region (RID1) with said first update region (RID1) and with at least one other update region (RID2).

According to a second aspect, there is provided an apparatus (400) comprising at least one processor (CNT1), a memory (MEM2) including computer program code (PROG1), the memory (MEM2) and the computer program code (PROG1) being configured to, with the at least one processor (CNT1), cause the apparatus (400) to perform at least the following:
  form a first gateway table (RTAB1) of a first update region (RID1) by adding a record to the first gateway table (RTAB1) such that the record associates a gateway (GID1, GID2, GID15) of the first update region (RID1) with said first update region (RID1) and with at least one other update region (RID2),
wherein substantially all gateway identifiers (GID1, GID2, GID15) of the first gateway table (RTAB1) are associated with the first update region (RID1).

According to a third aspect, there is provided an apparatus (400) comprising at least one processor (CNT1), a memory (MEM2) including computer program code (PROG1), the memory (MEM2) and the computer program code (PROG1) being configured to, with the at least one processor (CNT1), cause the apparatus (400) to perform at least the following:
  obtain a global gateway table (GTAB1) associating each gateway (GID1, GID2, GID15) of the navigation database (NDS) with an update region (RID1) and with a tile (T0303),
  select records from the global gateway table (GTAB1) such that each selected record contains a gateway (GID1) of the first update region (RID1), and
  form a first gateway table (RTAB1) by adding the selected records to the first gateway table (RTAB1).

According to a fourth aspect, there is provided an apparatus (500) comprising at least one processor (CNT2), a memory (MEM2) including computer program code (PROG1), the memory (MEM2) and the computer program code (PROG1) being configured to, with the at least one processor (CNT1), cause the apparatus (400) to perform at least the following:
  receive a first update region (RID1),
  receive a first gateway table (RTAB1),
  calculate a route (ROUTE12) from a first location of the first update region (RID1) to a second location of a second update region (RID2) by using the first update region (RID1), by using a second update region (RID2), and by using the first gateway table (RTAB1),
wherein substantially all gateway identifiers (GID1, GID2, GID15) of the first gateway table (RTAB1) are associated with the first update region (RID1).

According to a fifth aspect, there is provided a data structure, comprising:
  a first update region (RID1) of a navigational database (NDS), and
  a first gateway table (RTAB1) of the first update region (RID1) such that the first gateway table (RID1) associates each gateway (GID1) of the first update region (RID1) with said first update region (RID1) and with at least one other update region (RID2),
wherein substantially all gateway identifiers (GID1, GID2, GID15) of the first gateway table (RTAB1) are associated with the first update region (RID1).

According to a sixth aspect, there is provided a means for providing a gateway table, comprising:

means for providing a first update region (RID1) of a navigational database (NDS), and means for providing a first gateway table (RTAB1) of the first update region (RID1) such that the first gateway table (RTAB1) associates each gateway (GID1, GID2, GID15) of the first update region (RID1) with said first update region (RID1) and with at least one other update region (RID2).

A regional gateway table of an update region may contain information which associates gateways of the first update region with geographical tiles. The regional gateway table may be modified to contain additional information, which associates each gateways of the first update region with at least one other update region. Using the modified regional gateway table may make the global gateway table superfluous.

The regional gateway table may be provided e.g. as a part of a routing file, which is contained in an update package. The global gateway table may be optionally provided e.g. as a part of a product file, which contains the whole navigation database. A gateway table may be suitable for routing (i.e. for calculating a route). A regional gateway table may be called e.g. as the regional routing table. A global gateway table may be called e.g. as the global routing table.

It is not necessary to have a global gateway table any more, as the relevant gateway records may be contained in one gateway table of an update region.

The gateway table of a first update region does not need to contain a record for a gateway, which is not shared by said first update region. For example, a first update region may cover Germany, a second update region may cover France, and a third update region may cover Spain. In this case, the gateway table of Germany does not need to contain a record for a gateway of Spain because the Germany and Spain do not share any borders. Consequently, Germany and Spain do not share any gateways.

Single update regions may be incrementally updated, in particular by using a binary diff algorithm. A single update region may cover e.g. Germany, or France.

The update package may be self-contained. In an embodiment, the global index structure does not need to be updated when the update package is created or modified. The update package may be provided without changing the global index structure. Updating without modifying the global index structure may simplify updating.

In particular, updating the global index structure by SQL update may be avoided. The update package may be provided without changing the global index structure by SQL update.

BRIEF DESCRIPTION OF THE DRAWINGS

In the following examples, the embodiments will be described in more detail with reference to the appended drawings, in which.

DETAILED DESCRIPTION

Figure 1:
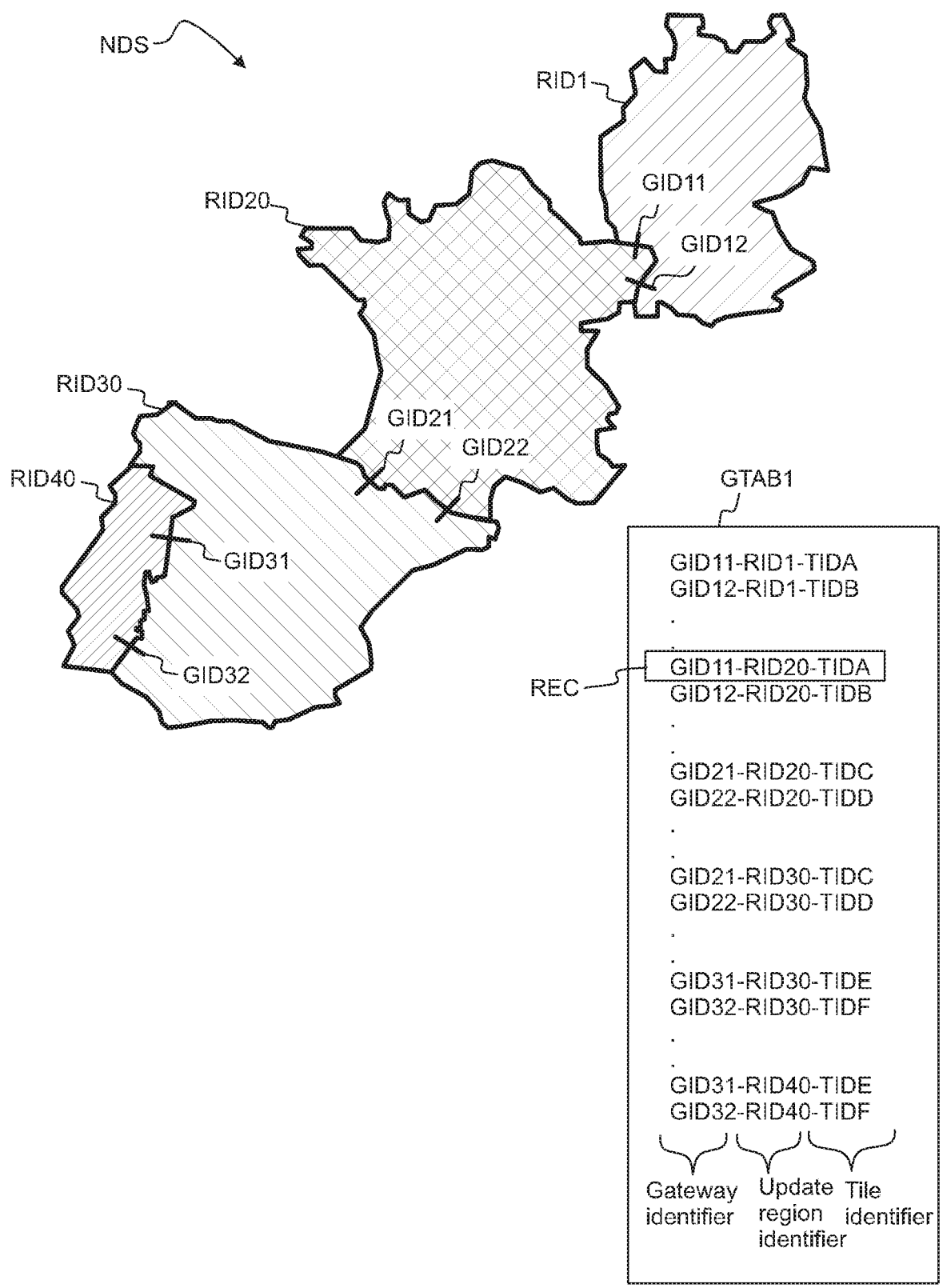
FIG. 1 shows, by way of example, a navigation database comprising a plurality of update regions.

Referring to FIG. 1, a navigational database NDS may comprise a plurality of update regions RID1, RID20, RID30, RID40. The update region RID1 may be connected with the update region RID20 by gateways GID11, GID12. The update region RID20 may be connected with the update region RID30 by gateways GID21, GID22. The update region RID30 may be connected with the update region RID40 by gateways GID31, GID32. The navigational database NDS may optionally comprise a global gateway table GTAB1. The global gateway table GTAB1 may associate each gateway of the navigational database NDS with at least one update region. A gateway may establish a topological connection from a routing building block of a first update region to a routing building block of a second update region. Each update of an update region may change the gateway entries for this update region.

Figure 6:
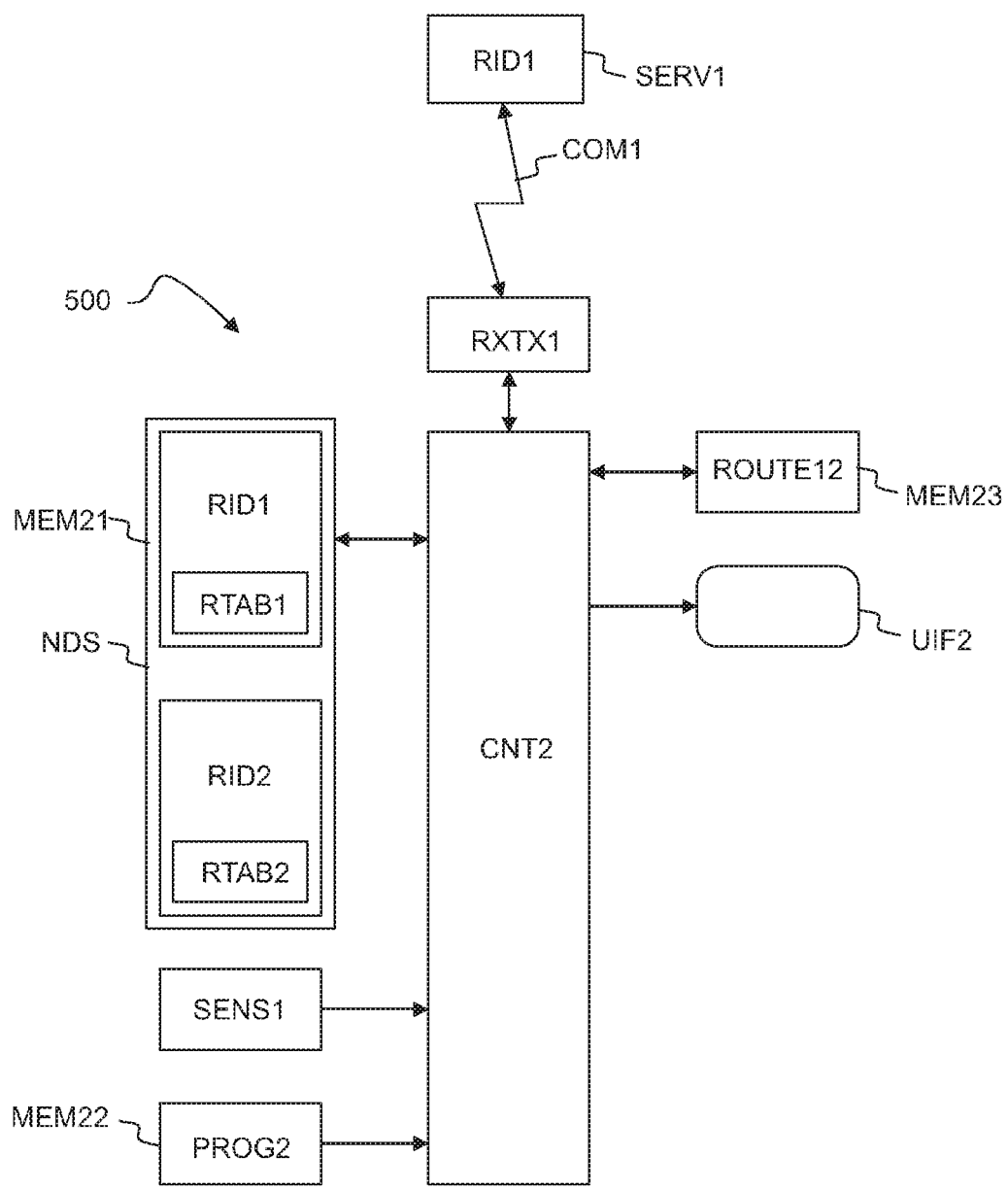
FIG. 6 shows, by way of example, a navigation device configured to determine a route.

The navigational database NDS may be stored e.g. in a memory of a navigation device or navigation system 500 (FIG. 6).

The navigational database NDS may comprise data files, which may be e.g. in the SQLite format. The data files of the navigational database may contain relational tables. In particular, the navigational database may comprise a global gateway table GTAB1, which may associate each gateway GID11, GID12, GID21, GID22, GID31, GID32 of the navigational database NDS with an update region and with a geographical tile.

The geographical area of the earth may be subdivided into tiles, which may form a regular grid covering the complete surface of the earth. A single tile may overlap one or more update regions. The tiles may partition the data that is available. The tiles may be used for data access and for referencing data content according to its geographic position.

An update region may represent a geographic area within a product database that may be subject to an update. An update region may represent e.g. a single state, e.g. Germany or France. The navigation database may be divided into two or more update regions. Update regions may comprise multiple building blocks. A building block may that include e.g. records, tiles, BLOBs etc. BLOB means a binary large object. Two or more adjacent update regions of a product database may be connected with each other at certain points of their borders. Said points may be called as the gateways.

The navigation database NDS may comprise several product databases. Each product database may be provided by a single database supplier, may have its own version control, and may be updated independently from other product databases. A product database may contain one or more building blocks and may cover a geographic area. The geographic area may be further divided into several update regions. In other words, a product database may be subdivided into two or more update regions. A product database may cover a specific geographic area, which may be further divided into several update regions. The navigation database NDS may contain several product databases in parallel. An update region RID1 may represent e.g. Germany. An update region RID20 may represent e.g. France. An update region RID30 may represent e.g. Spain. An update region RID40 may represent e.g. Portugal.

For example, gateways GID11, GID12 may connect the update region RID1 with the update region RID20. Gateways GID21, GID22 may connect the update region RID20 with the update region RID30. Gateways GID31, GID32 may connect the update region 30 with the update region 40. Gateway GID11 may be located e.g. in a tile having an identifier TIDA. Gateway GID12 may be located e.g. in a tile TIDB. Gateway GID21 may be located e.g. in a tile TIDC. Gateway GID22 may be located e.g. in a tile TIDD. Gateway GID31 may be located e.g. in a tile TIDE. Gateway GID32 may be located e.g. in a tile TIDF.

The global gateway table GTAB1 may comprise a plurality of records REC. Each record REC may associate a gateway with an update region and with a tile. Associating a gateway with an update region may specify that said gateway is shared by said update region. The gateway may be associated with the update region by associating the identifier of said gateway with said update region. Associating an identifier of with an update region may specify that said gateway is shared by said update region. A gateway associated with a first update region and a second update region may be shared with the first update region and with the second update region.

The first update region RID1 may share one or more gateways GID11, GID21 with an adjacent update region RID20. One or more update regions RID30, RID40 may be located such that they do not share any common gateways with the first update region RID1.

Figure 2:
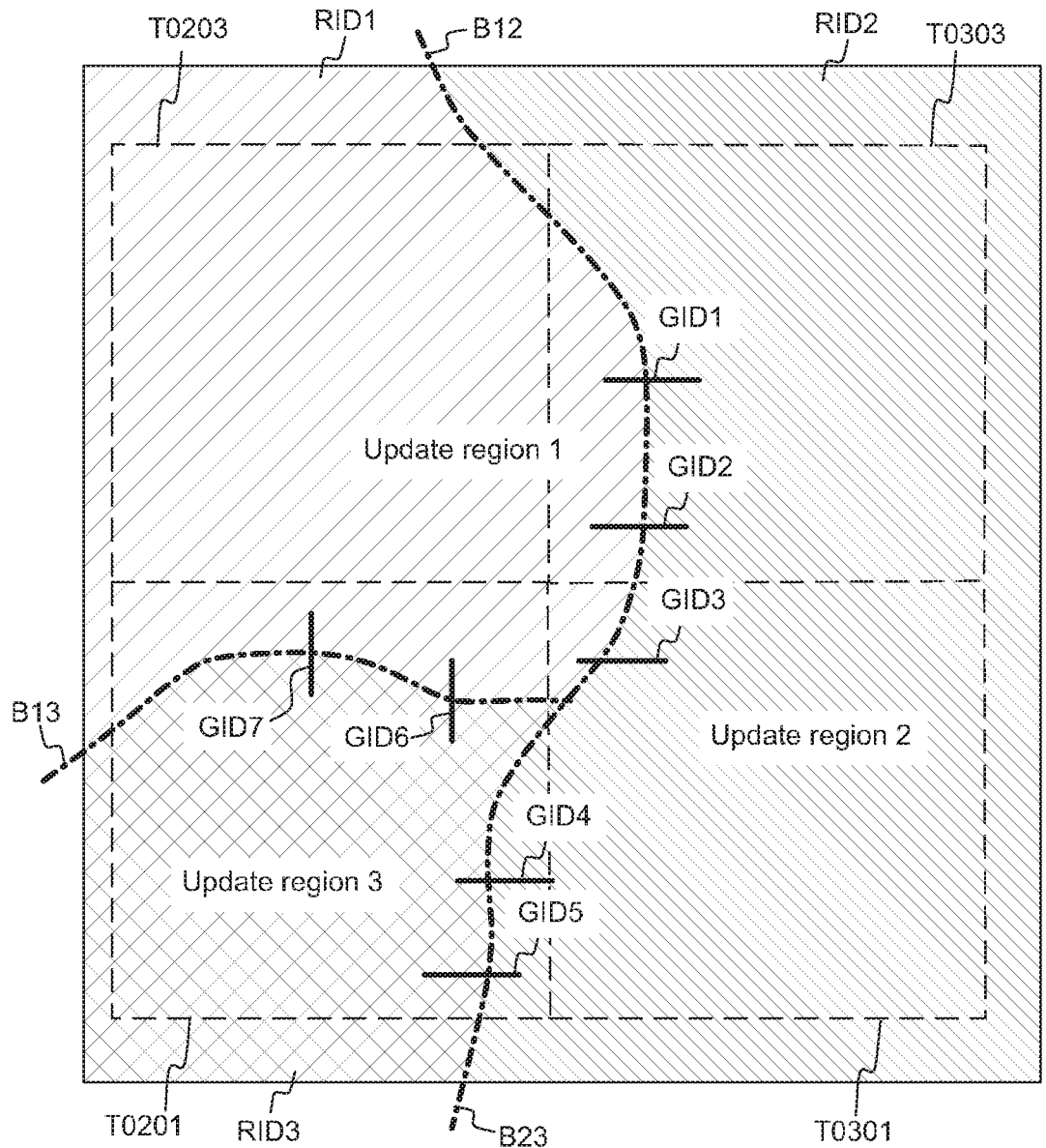
FIG. 2 shows, by way of example, gateways connecting adjacent update regions.

FIG. 2 shows three adjacent update regions RID1, RID2, RID3. The update region RID1 may be connected with the update region RID2 by gateways GID1, GID2, GID3. The update region RID2 may be connected with the update region RID3 by gateways GID4, GID5. The update region RID2 may be connected with the update region RID3 by gateways GID6, GID7. The update region GID1 may have a common border B12 with the update region GID2. The border B12 of the first update region RID1 may also be a border of the second update region RID2. The update region GID2 may have a common border B23 with the update region GID3. The update region GID1 may have a common border B13 with the update region GID3. Each gateway may be represented by an intersection on a common border.

Each gateway may be assigned with a unique identifier. In other words, two different gateways should not have the same identifier. The unique identifier of a gateway may be e.g. a gateway identifier. In particular, the gateway identifier may be a gateway number. For example, the gateway number of a first gateway GID1 may be "1", and the gateway number of a second gateway GID2 may be "2". In an embodiment, the gateway identifier may also be a unique code, e.g. "abc123".

The unique gateway identifiers of all gateways of a navigational database NDS may be stored in a table, which may be called e.g. as the global gateway table ("GlobalGatewayTable"). The navigational database NDS may comprise a global gateway table, which comprises the gateway identifiers of the gateways of said navigational database NDS.

A navigational database NDS may comprise the first update region RID1, the second update region RID2, and the third update region RID3. Updating of the navigational database NDS may comprise modifying the first update region RID1 without modifying the second update region RID2, and without modifying the third update region RID3.

Updating of the navigational database NDS may comprise modifying the first update region RID1 and modifying the second update region RID2, without modifying the third update region RID3.

The gateway GID1 may be located e.g. in a tile identified by an identifier T0303. The gateway GID2 may be located e.g. in a tile T0303. The gateway GID3 may be located e.g. in a tile T0301. The gateway GID4 may be located e.g. in a tile T0201. The gateway GID5 may be located e.g. in a tile T0201. The gateway GID6 may be located e.g. in a tile T0201. The gateway GID7 may be located e.g. in a tile T0201.

Figure 3A:
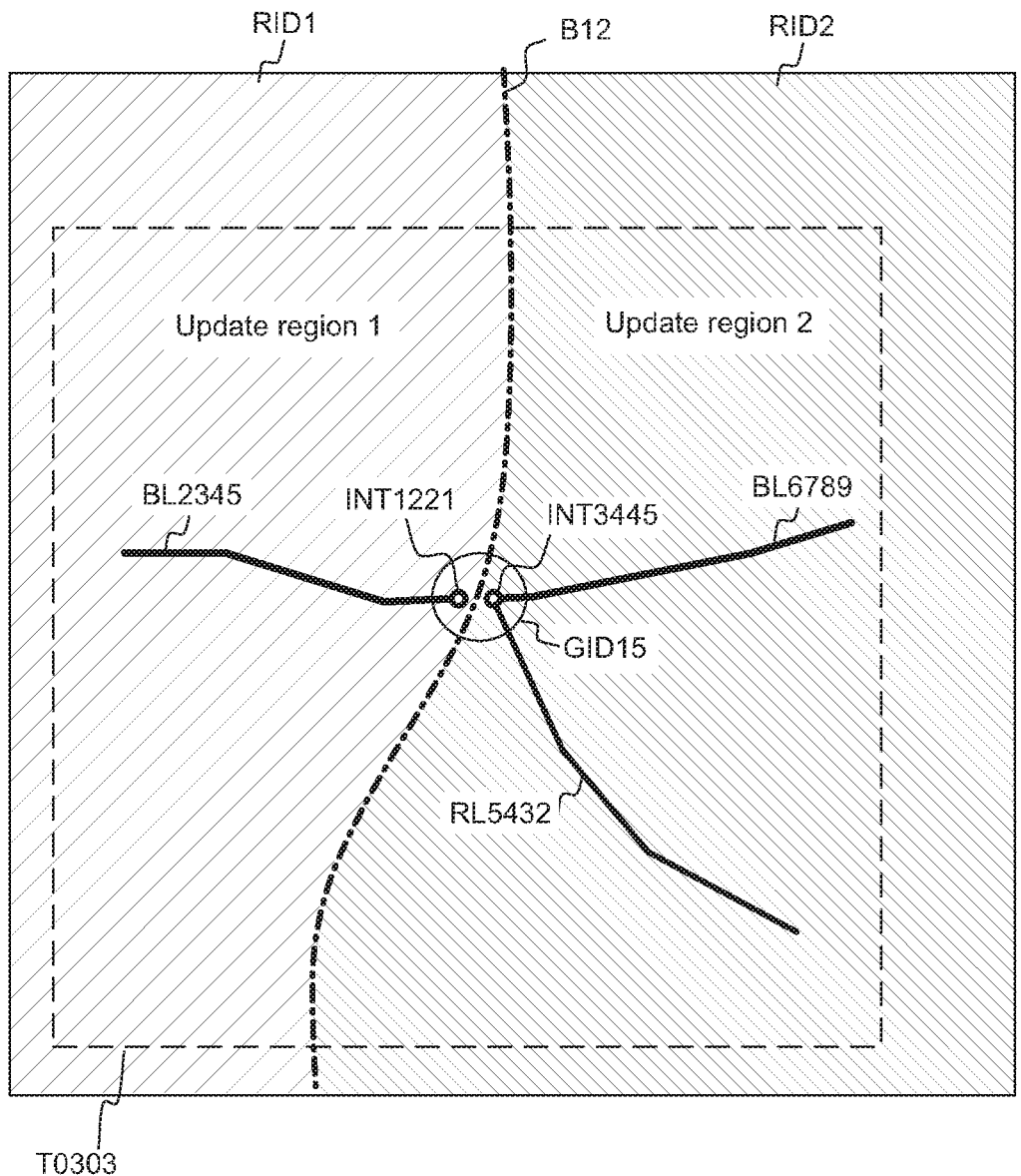
FIG. 3a shows, by way of example, a gateway connecting a first update region with a second update region.

Referring to FIG. 3a, a first update region RID1 may be connected with a second adjacent update region RID2 by a gateway, for example by a gateway GID15. The gateway GID15 may be represented by an intersection on a common border B12. The intersection may be a real intersection or a pseudo intersection. The real intersection may also be called e.g. as a junction or a common branching point of three or more links. The pseudo intersection may be a point where a route link crosses a border B12.

The first update region RID1 may comprise a link BL2345. The link BL2345 may end at an intersection INT1221 located directly on the border B12. The second update region RID2 may comprise links BL6789, RL5432. The links BL6789, RL5432 may end at an intersection INT3445 located directly on the border B12. The intersection INT1221 may substantially coincide with the intersection INT3445 so that the intersections INT1221, INT3445 may be represented by the same gateway GID15.

The gateway GID15 may connect a link BL2345 to the link BL6789 and to the link RL5432. A gateway may connect a link of a first update region to one or more links of a second update region. A gateway may connect the road network of a first update region to the road network of a second update region.

The first update region and the second update region may be complied independently, and the same intersection may get a first identifier in the first update region and a second different identifier in the second update region. The number of connected streets stored with an intersection in an update region may refer to the number of links stored within said update region. For example, the intersection INT1221 of the first region RID1 may have only one connected link BL2345 within the first region RID1, and the intersection INT3445 of the second region RID2 may have two connected links BL6789 and RL5432 within the second region RID2, in a situation where the intersection INT1221 coincides with the intersection INT3445.

Figure 3B:
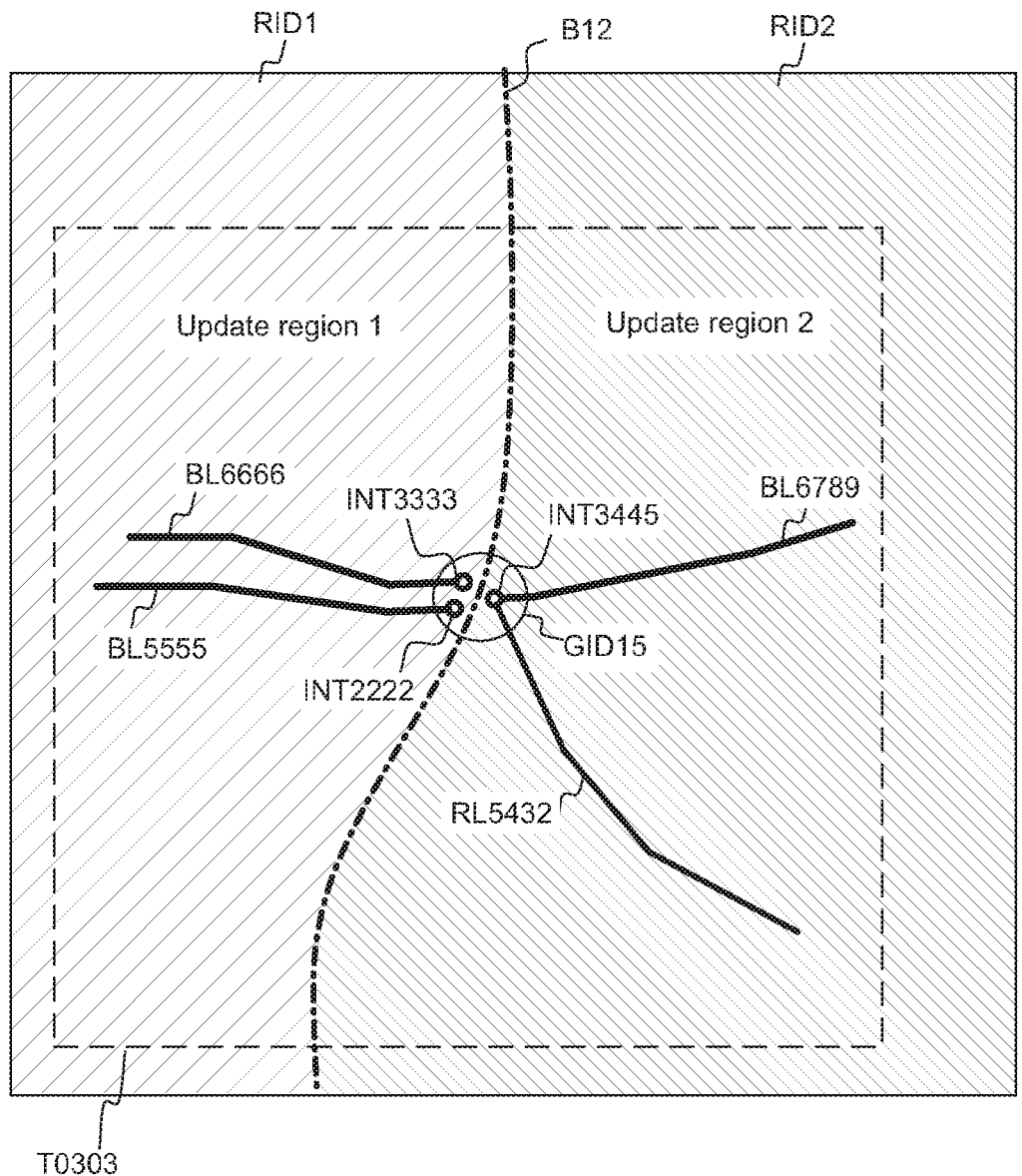
FIG. 3b shows, by way of example, a gateway connecting the first update region with the second update region, after the first update region has been modified.

The intersections shown in FIGS. 3a and 3b are drawn slightly aside from each other for clarity, although said intersections may spatially coincide with each other.

To enable a navigation device to merge intersections INT1221, INT3445 on both sides of an update region border B12, each intersections INT1221, INT3445 may have a flexible gateway attribute.

For example, an intersection INT1221 in tile T0303 in update region RID1 may have the following flexible gateway attribute:
gatewaynumber=15

For example, an intersection INT3445 in tile T0303 in update region RID2 may have the following flexible gateway attribute:
gatewaynumber=15

The global gateway table and/or the regional gateway table may have the following entries (REC):
Gateway 15; updateregionId 1; tile 0303: level 13
Gateway 15; updateregionId 2; tile 0303: level 13

On the basis of this data, a navigation device may use the gateway table e.g. to determine a route from the first update region RID1 to the second update region RID2.

The gateway identifier may be called e.g. as "gatewaynumber" or "gatewayId". The update region identifier may be called e.g. as the "updateregionID". The tile identifier may be called e.g. as "tileID". A tile may be associated with one or more levels.

The geographical data may be partitioned into a higher number of tiles to represent a detailed map with higher spatial resolution, or to lower number of tiles to represent a general view with lower spatial resolution. The "level" may indicate the degree of partitioning of the data. An upper level may correspond to a larger map scale and may be represented by a lower level number. A lower level may contain more detailed information than the upper level. The lower level may be represented by a higher level number.

Referring to FIG. 3b, the first update region RID1 of the database NDS may be modified without modifying the second update region RID2 of the database NDS. For example, the intersection INT1221 may be replaced with intersections INT2222 and INT3333. For example, the link BL2345 may be replaced with links BL5555, BL6666.

The first update region RID1 may be modified e.g. as follows in order to maintain the topology between the first update region RID1 and the second update region RID2

For example, the intersection INT2222 replacing the previous intersection INT1221 may have the following flexible gateway attribute:
gatewaynumber=15

For example, the intersection INT3333 replacing the previous intersection INT1221 may have the following flexible gateway attribute:
gatewaynumber=15

Thus, the intersections INT2222, INT3333 replacing the previous intersection INT1221 may keep the gateway identifier of said previous intersection, and the global gateway table GTAB1 may remain unchanged.

However, e.g. building a new motorway from the first update region to the second update region may create a new gateway (e.g. the gateway GID15) connecting the first update region with the second update region. Information about the new gateway may be communicated to a navigation device so that the navigation device may calculate a route by using the new gateway. In an embodiment, information about the new gateway may be communicated to the navigation device by using a regional gateway table (RTAB1), without a need to use the global gateway table (GTAB1). The use of the regional gateway table (RTAB1) may facilitate partial updating of the navigation database NDS stored in a memory of the navigation device.

The navigation database NDS may be updated partially. Partial updating may comprise installation of a new update region and/or modifying a previous update region. An update region may be added and/or modified without changing other update regions of the navigation database NDS. For example, an update region of e.g. Germany may be combined with an update region of e.g. Poland or with an update region of Eastern Europe, which contains Poland.

Partial updating may comprise transferring a regional gateway table RTAB1 to a memory of a navigation device 500. An update package may comprise a regional gateway table RTAB1.

Figure 4A:
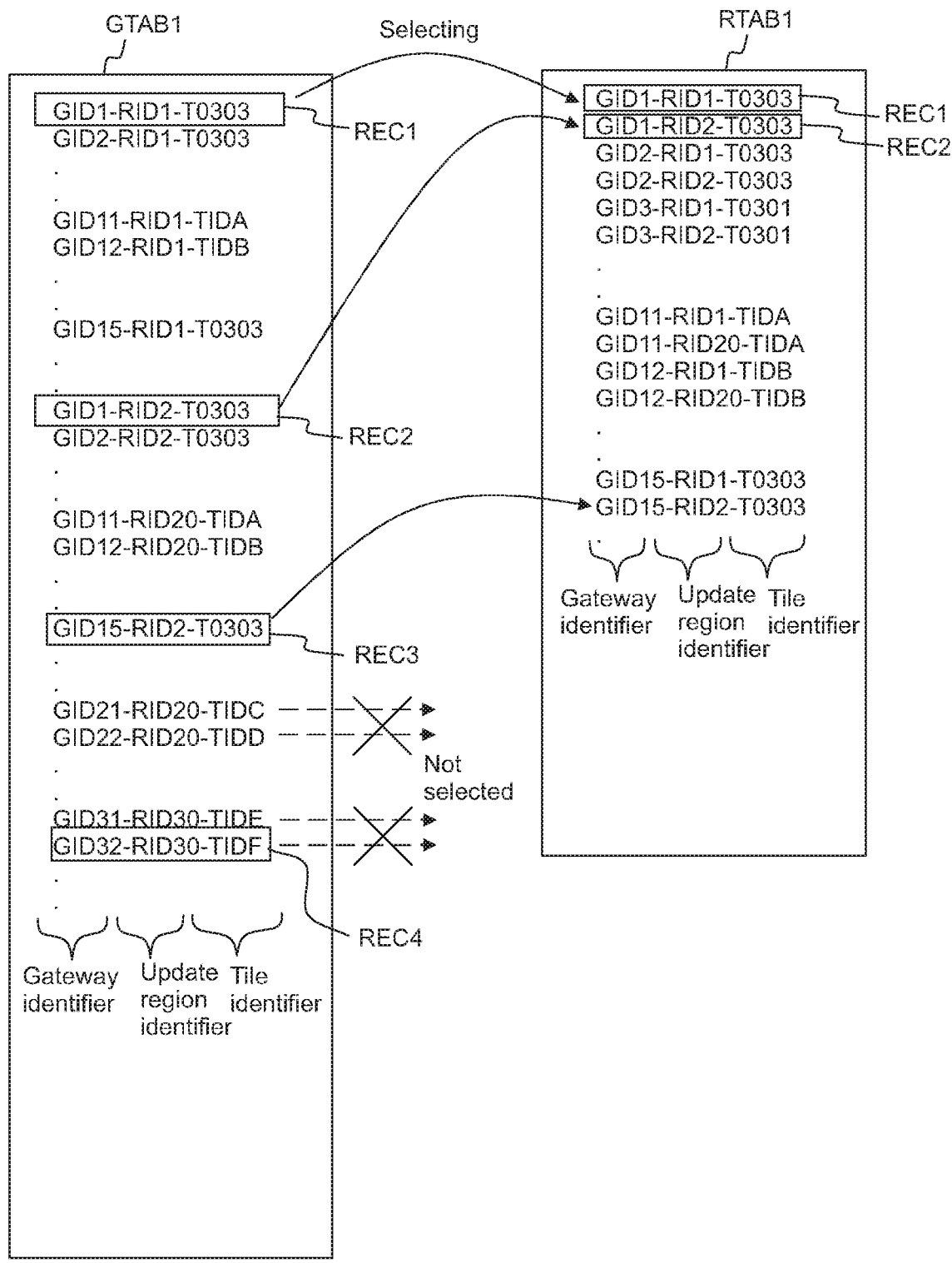
FIG. 4a shows, by way of example, forming a regional gateway table from a global gateway table.

Referring to FIG. 4a, the regional gateway table RTAB1 may be formed e.g. by selecting records REC1, REC2, REC3 from the global gateway table GTAB1.

The regional gateway table RTAB1 may be formed e.g. by:
obtaining a global gateway table GTAB1, which associates each gateway of the navigation database with an update region and with a tile,
selecting one or more records from the global gateway table GTAB1 such that each selected record contains a gateway of the first update region, and
forming the regional gateway table by adding the selected one or more records to the first gateway table RTAB1.

The regional gateway table RTAB1 may be formed e.g. by:
obtaining a global gateway table GTAB1, which associates each gateway GID1, GID2, GID15 of the navigation database NDS with an update region RID1 and with a tile T0303,
selecting records REC1, REC2 from the global gateway table GTAB1 such that each selected record REC1, REC2 contains a gateway GID1 of the first update region RID1, and
forming the regional gateway table RTAB1 by adding the selected records REC1, REC2 to the first gateway table RTAB1.

For example, the global gateway table GTAB1 may comprise data shown in Table 1.

TABLE 1

| Part of a global gateway table GTAB1 (example). | | |
|---|---|---|
| gatewayId | updateRegionId | tileId |
| ... | ... | ... |
| ... | ... | ... |
| 54798532 | 142 | 67243905 |
| 54798532 | 142 | 545513564 |
| 54799116 | 142 | 67243908 |
| 54799116 | 142 | 545513737 |
| 54801114 | 142 | 4194831 |
| 54801114 | 142 | 16785656 |
| ... | ... | ... |
| ... | ... | ... | gatewayId denotes gateway identifier. updateRegionId denotes update region identifier. tileId denotes tile identifier.

For example, the regional gateway table RTAB1 of the first update region determined from the global gateway table may comprise data shown in Table 2.

TABLE 2

| Part of a first gateway table RTAB1 (example). | | |
|---|---|---|
| gatewayId | updateRegionId | tileId |
| ... | ... | ... |
| ... | ... | ... |
| 54798532 | 142 | 67243905 |
| 54798532 | 142 | 545513564 |
| 54798532 | 153 | 67243905 |
| 54798532 | 153 | 545513564 |
| 54799116 | 142 | 67243908 |
| 54799116 | 142 | 545513737 |
| 54799116 | 153 | 67243908 |
| ... | ... | ... |
| ... | ... | ... |

For example, the global gateway table GTAB1 may contain e.g. the following first record, which associates a gateway (GatewayID=54798532) with an update region (RegionId=142) and with a tile (tileId=67243905): (GatewayID=54798532 update, RegionId=142, tileId=67243905). For example, the regional gateway table RTAB1 determined from the global gateway table GTAB1 may comprise e.g. the following additional record (GatewayID=54798532 update, RegionId=153, tileId=67243905), which associates said gateway (GatewayID=54798532) and tile (tileId=67243905) with another update region (RegionId=153), together with said first record.

The regional gateway table may refer to a table called as the "routing.globalGatewayTable". The navigational database NDS may comprise a routing database file called as the "routing.nds" file. The file "routing.nds" may comprise the regional gateway table "routing.globalGatewayTable".

The global gateway table may refer to a table called as the "product.globalGatewaytable". The navigational database NDS may comprise a product database file called as the "product.nds" file. The file "product.nds" may comprise the global gateway table "product.globalGatewaytable".

The regional gateway table RTAB1 may be formed e.g. by using the following commands of the Structured Query Language (SQL):
CREATE routing.globalGatewayTable AS
SELECT*FROM product.globalGatewaytable WHERE gatewayID IN
(SELECT gatewayID FROM product.globalGatewaytable WHERE updateRegionId=NNN)

An apparatus (400) executing these commands may perform e.g. the following operations:
select all gateways of a certain update region NNN (inner part of the SQL-query), and then
add all those records of the global gateway table (GTAB1, GlobalGatewayTable) from a product.nds file to a regional gateway table (RTAB1, GlobalGatewayTable) of a routing.nds file which contain any gateway which occurs in the update region NNN.

The method may comprise:
providing a navigational database (NDS), which comprises:
a first routing file of a first update region,
a second routing file of a second update region, and
a global gateway table (product.globalGatewaytable) associating each gateway of the navigation database (NDS) with an update region and with a tile,
wherein the first routing file comprises a first gateway table (product.globalGatewaytable) such that the first gateway table associates each gateway of the first update region with at least one tile,
modifying the first update region (Germany),
selecting records from the global gateway table (product.globalGatewaytable) such that each selected record contains a gateway of the first update region, and
adding the selected records to the first gateway table (routing.globalGatewayTable).

In this way, a self-contained regional gateway table RTAB1 representing substantially all gateways of the first update region RID1 may be formed from the global gateway table GTAB1. Substantially all gateway identifiers of the regional gateway table RTAB1 may be associated with the first update region RID1. The regional gateway table RTAB1 may be updated when one or more gateways of the first update region RID1 are changed (e.g. added, removed, moved and/or re-named). The regional gateway table RTAB1 does not need to be updated when a gateway outside the first update region RID1 is changed.

The regional gateway table RTAB1 of the first update region RID1 may be formed e.g. when the version number of the first update region RID1 has been changed, By using the regional gateway table RTAB1, the update region RID1 may be added to navigational database NDS without changing other existing update regions of the navigational database NDS. By using the regional gateway table RTAB1, the update region RID1 of the navigational database NDS may be modified without changing other existing update regions of the navigational database NDS. In an embodiment, this may mean duplicating the number of records in the regional gateway table (RTAB1, GlobalGatewayTable) of a routing.nds file of the navigational database NDS. For each record in the former version, a new record may be added which only differs in the update region identifier (updateRegionID).

When forming the regional gateway table RTAB1 of the first update region by selecting records REC1, REC2, REC3 from a global gateway table GTAB1, those records (e.g. the record REC4) may be omitted which do not contain a gateway of the first update region. Consequently, the data size of the regional gateway table RTAB1 may be substantially smaller than the data size of the global gateway table GTAB1.

In an embodiment, the regional gateway table RTAB1 of the first update region RID1 does not need to contain those records (e.g. REC1) which explicitly indicate that a particular gateway belongs to the first update region RID1. These (multiple) records may be replaced by a single piece of data, which specifies that all gateway identifiers contained in the regional gateway table RTAB1 are associated with the first update region RID1. For example, a header of the regional gateway table RTAB1 may contain data, which indicates that the gateway identifiers contained in the regional gateway table RTAB1 are associated with the first update region RID1. For example, the regional gateway table RTAB1 may contain data, which indicates that the regional gateway table RTAB1 is a gateway table RTAB1 of the first update region RID1. For example, a header of the regional gateway table RTAB1 may contain data, which indicates that the regional gateway table RTAB1 is a gateway table RTAB1 of the first update region RID1. For example, external data stored in another file may indicate that the regional gateway table RTAB1 is a gateway table RTAB1 of the first update region RID1.

A regional gateway table RTAB1 may be indicated to be the regional gateway table RTAB1 of the first update region RID1 by a single indication. It is not necessary to repeat this indication reference several times. Consequently, the gateways of a first regional gateway table RTAB1 may be associated with said first regional gateway table RTAB1 also in a situation where records of the first regional gateway table RTAB1 do not explicitly contain the identifier of the first region RID1. In an embodiment, substantially all records (e.g. the record REC1) containing the identifier RID1 of the first region RID1 may be removed from the regional gateway table RTAB1, e.g. in order to reduce the data size of the regional gateway table RTAB1. Substantially all records containing the identifier RID1 of the first region RID1 may be removed from the regional gateway table RTAB1 without causing loss of information.

Figure 4B:
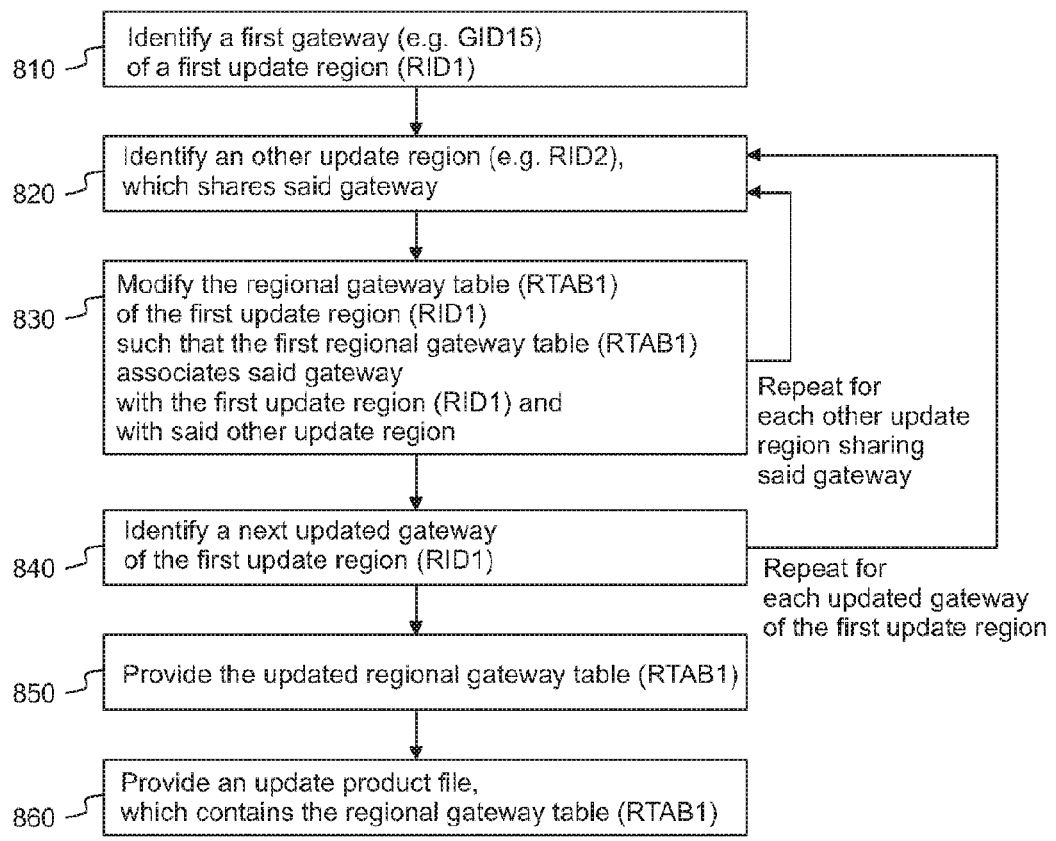
FIG. 4b shows method steps for forming a regional gateway table.

FIG. 4b shows, by way of example, method steps for providing a regional gateway table GTAB1.

In step 810, a first gateway (e.g. the gateway GID15) of the first update region RID1 may be identified. The first gateway may be identified e.g. by analyzing an update region RID1 or by selecting from a global gateway table GTAB1. The first gateway may be identified e.g. by comparing a modified update region RID1 with an earlier version of said update region RID1.

In step 820, an additional update region (e.g. RID2) may be identified such that said additional update region RID2 shares the first gateway GID15. The additional update region RID2 may be identified e.g. by analyzing one or more additional update regions RID2 or by selecting from a global gateway table GTAB1.

In step 830, the regional gateway table RTAB1 of the first update region RID1 may be modified such that the regional gateway table RTAB1 associates the first gateway GID15 with the first update region RID1 and with said additional update region RID2. This step 830 may comprise creating the regional gateway table RTAB1 if it does not exist yet.

Steps 820 and 830 may be repeated for each additional update region, which shares the first gateway GID15. Consequently, the first gateway may be associated with the first update region and with one or more additional update regions.

In step 840, a next gateway of the first update region RID1 may be identified.

Steps 820, 830, 840 may be repeated for said next gateway to associate said next gateway with the first update region and with one or more additional update regions.

The steps 820 to 840 may be repeated until at least 50% of the modified gateways of the first update region have been taken into consideration. The steps 820 to 840 may be repeated until at least 90% of the modified gateways of the first update region have been taken into consideration. The steps 820 to 840 may be repeated until substantially all modified gateways of the first update region have been taken into consideration.

The regional gateway table RTAB1 may be provided in step 850.

A product file may be provided in step 860, wherein the product file may comprise the regional gateway table RTAB1.

A method of providing a regional gateway table GTAB1 may comprise modifying an existing regional gateway table GTAB1, by using the steps 810 to 820. In an embodiment, only records containing an updated gateway of the first update region RID1 need to be modified or created, in order to reduce data processing. However, also substantially all records containing a gateway of the first update region RID1 may be modified or created, in order to make sure that the regional gateway table GTAB1 contains records for each gateway of the first update region RID1.

A method for providing a new regional gateway table GTAB1 may comprise the steps 810 to 850. The table GTAB1 does not need to exist before performing the step 830.

Figure 5A:
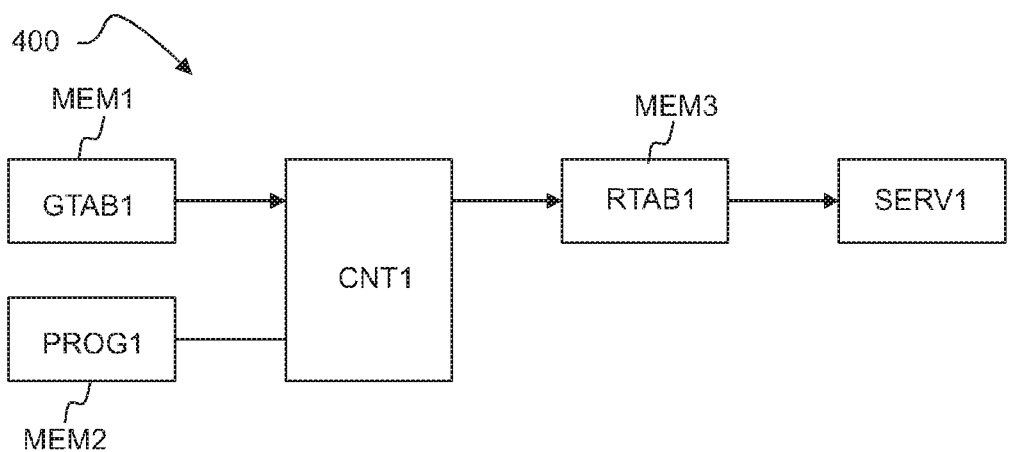
FIG. 5a shows, by way of example, an apparatus for forming a regional gateway table.

Referring to FIG. 5a, an apparatus 400 may be configured to form the regional gateway table RTAB1 by selecting records from a global gateway table GTAB1. The apparatus 400 may comprise a control unit CNT1, which in turn may comprise one or more data processors. The apparatus 400 may comprise an input memory MEM1 for storing the global gateway table GTAB1. The apparatus 400 may comprise an output memory MEM3 for storing the regional gateway table RTAB1. The apparatus 400 may comprise a memory MEM2 for storing computer program PROG1. The regional gateway table RTAB1 may be further communicated e.g. to an Internet server SERV1. The server SERV1 may be separate from the apparatus 400. The apparatus 400 may also be implemented in a server SERV1.

The apparatus (400) may comprise at least one processor (CNT1), and a memory (MEM2) including computer program code (PROG1). The memory (MEM2) and the computer program code (PROG1) may be configured to, with the at least one processor (CNT1), cause the apparatus (400) to perform at least the following:
  obtain a global gateway table (GTAB1) associating each
    gateway (GID1, GID2, GID15) of the navigation database (NDS) with an update region (RID1) and with a tile (T0303),
  select records from the global gateway table (GTAB1)
    such that each selected record contains a gateway (GID1) of the first update region (RID1), and
  form a first gateway table (RTAB1) by adding the selected records to the first gateway table (RTAB1).
wherein substantially all gateway identifiers (GID1, GID2, GID15) of the first gateway table (RTAB1) are associated with the first update region (RID1).

At least 50% of the gateway identifiers of the first gateway table RTAB1 may be associated with the first update region. At least 90% of the gateway identifiers of the first gateway table RTAB1 may be associated with the first update region. At least 99% of the gateway identifiers of the first gateway table RTAB1 may be associated with the first update region. Substantially all gateway identifiers of the first gateway table RTAB1 may be associated with the first update region, e.g. in order to avoid transferring superfluous data. The gateway table RTAB1 may comprise e.g. more than 10 different gateway identifiers. The gateway table RTAB1 may comprise e.g. more than 100 different gateway identifiers.

Figure 5B:
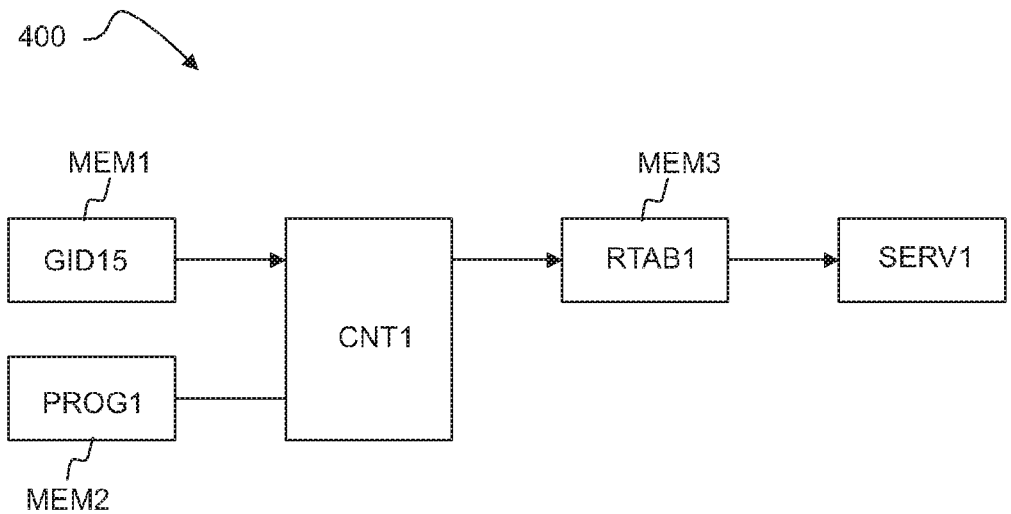
FIG. 5b shows, by way of example, an apparatus for forming a regional gateway table.

In an embodiment, the global gateway table (GTAB1) does not need to be used. Referring to FIG. 5b, an apparatus 400 may be configured to form the regional gateway table RTAB1 by forming a first gateway table (RTAB1) of a first update region (RID1) by adding a record to the first gateway table (RTAB1) such that the record associates a gateway (GID1, GID2, GID15) of the first update region (RID1) with said first update region (RID1) and with at least one other update region (RID2), wherein substantially all gateway identifiers (GID1, GID2, GID15) of the first gateway table (RTAB1) are associated with the first update region (RID1).

The apparatus 400 may comprise a control unit CNT1, which in turn may comprise one or more data processors. The apparatus 400 may comprise an input memory MEM1 for storing one or more records relating to a new gateway (e.g. GID15). The apparatus 400 may comprise an output memory MEM3 for storing the regional gateway table RTAB1. The apparatus 400 may comprise a memory MEM2 for storing computer program PROG1. The regional gateway table RTAB1 may be further communicated e.g. to an Internet server SERV1. The server SERV1 may be separate from the apparatus 400. The apparatus 400 may also be implemented in a server SERV1.

The apparatus (400) may comprise at least one processor (CNT1), and a memory (MEM2) including computer program code (PROG1). The memory (MEM2) and the computer program code (PROG1) may be configured to, with the at least one processor (CNT1), cause the apparatus (400) to perform at least the following:
  form a first gateway table (RTAB1) of a first update region
    (RID1) by adding a record to the first gateway table (RTAB1) such that the record associates a gateway (GID1, GID2, GID15) of the first update region (RID1) with said first update region (RID1) and with at least one other update region (RID2), wherein substantially all gateway identifiers (GID1, GID2, GID15) of the first gateway table (RTAB1) may be associated with the first update region (RID1).

If needed, a second regional gateway table GTAB2 may be formed for a second update region RID2. The first update region RID1 may have gateways which are not shared by the second update region RID2, and the regional gateway table GTAB2 may be different from the first regional gateway table RTAB1.

The method may comprise:
providing a second update region (RID2) of a navigational database (NDS), and
providing a second gateway table (RTAB2) of the second update region (RID2) such that the second gateway table (RTAB2) associates each gateway (GID1, GID2, GID15) of the second update region (RID2) with said second update region (RID2) and with at least one other update region (RID1, RID3),
wherein the second gateway table (RTAB2) is different from the first gateway table (RTAB1).

At least 50% of the gateway identifiers of the first gateway table RTAB1 may be associated with the first update region. At least 90% of the gateway identifiers of the first gateway table RTAB1 may be associated with the first update region. At least 99% of the gateway identifiers of the first gateway table RTAB1 may be associated with the first update region. Substantially all gateway identifiers of the first gateway table RTAB1 may be associated with the first update region, e.g. in order to avoid transferring superfluous data. The gateway table RTAB1 may comprise e.g. more than 10 different gateway identifiers. The gateway table RTAB1 may comprise e.g. more than 100 different gateway identifiers.

The computer program PROG1 may be stored in a non-transitory computer-readable medium. The gateway table RTAB1 may be stored in a non-transitory computer-readable medium.

Referring to FIG. 6, the regional gateway table RTAB1 may be used e.g. for calculating a route ROUTE12 from a first location of the first update region RID1 to a second location of a second adjacent update region RID2. The regional gateway table RTAB1 may contain information about all gateways which are relevant for calculating the route ROUTE12 from the first update region RID1 to the second update region RID2. In an embodiment, the global gateway table GTAB1 does not need to be used when calculating the route ROUTE12 from the first update region RID1 to the second update region RID2. The route ROUTE12 may be calculated by using the regional gateway table RTAB1, without using the global gateway table GTAB1

A navigation device 500 may comprise a control unit CNT2, which in turn may comprise one or more data processors. The navigation device 500 may comprise a memory MEM21 for storing a navigational database NDS. The navigational database NDS may comprise e.g. a first update region RID1 and a second update region RID2, an optionally also other update regions. The navigational database NDS may comprise the first regional gateway table RTAB1 of the first update region RID1. The navigational database NDS may further comprise one or more other regional gateway tables, e.g. the regional gateway table RTAB2 of the second update region RID2. The navigation device 500 may optionally comprise a position sensor SENS1. The position sensor SENS1 may be e.g. satellite navigation unit (e.g. a GPS or GLONASS sensor) or a unit which determines position based on identifiers of radio transmitters. The navigation device 500 may comprise a memory MEM22 for storing computer program PROG2. The navigation device 500 may comprise a communication unit RXTX1 for receiving an update package. The communication unit RXTX1 may receive the update package e.g. by wireless communication COM1 from an internet server SERV1. The update package may comprise e.g. the first update region RID1 and the first regional gateway table RTAB1 of the first update region RID1.

An update region RID1 and the regional gateway table RTAB1 may be transferred to a navigation device 500 e.g. from an Internet server SERV1. The update region RID1 may be transferred from the server SERV1 e.g. by using a mobile communications network (e.g. UMTS, GPRS), wireless local area network (WLAN), or via a modem and a data cable. An update region RID1 may be transferred to the navigation device 500 e.g. by using a USB storage device or a flash card. The update region RID1 and the regional gateway table RTAB1 may be transferred e.g. to the memory MEM21 of the navigation device 500.

The computer program PROG2 may be stored in a non-transitory computer-readable medium. The gateway table RTAB1 may be stored in a non-transitory computer-readable medium.

The navigation device 500 may be e.g. a portable device. The navigation device 500 may be implemented e.g. in a portable computer, mobile phone, smart phone, and/or tablet computer. The navigation device 500 may also be installed e.g. in a vehicle.

The navigation device 500 may also be implemented in a distributed manner. For example, the position sensor SENS1 and the user interface UIF23 may be implemented as a first mobile unit of the device 500, and the calculation of the route ROUTE12 may be carried out by a second stationary unit of the device 500. In particular, the calculation of the route ROUTE12 may be carried out by an application running on a server.

The navigation device 500 may be installed e.g. in a vehicle, and an update region RID1 may be transferred to the navigation device 500 e.g. when the vehicle is visiting a service center.

The navigation device 500 may comprise a user interface UIF2 for receiving user input from a user and/or for providing instructions to the user. For example, the user interface UIF2 may comprise a display, in particular a touch screen, which may be arranged to display a route ROUTE12 on a map. For example, the destination (the second location) may be defined by using the user interface UIF2. For example, the user interface UIF2 may be arranged to receive speech input from the user, and/or the user interface UIF2 may be arranged to provide spoken instructions.

The navigation device 500 may be configured to calculate a route ROUTE12 from a first location of the first update region RID1 to a second location of the second adjacent update region RID2, by using the first update region (RID1), by using a second update region (RID2), and by using the first gateway table (RTAB1). In an embodiment, said route ROUTE12 may be calculated without using the global gateway table GTAB1. In an embodiment, said route ROUTE12 may be calculated without using the second regional gateway table of the second update region RID2.

The navigation device (500) may comprise at least one processor (CNT2), and a memory (MEM2) including computer program code (PROG2). The memory (MEM2) and the computer program code (PROG2) may be configured to, with the at least one processor (CNT1), cause the apparatus (400) to perform at least the following:
receive a first update region (RID1), receive a first gateway table (RTAB1),
calculate a route (ROUTE12) from a first location of the first update region (RID1) to a second location of a second update region (RID2) by using the first update region (RID1), by using a second update region (RID2), and by using the first gateway table (RTAB1).

If the software application PROG2 running on the navigation device 500 detects a gateway identifier GID15 during routing in the first update region RID1, one or more other update regions RID2 sharing said gateway GID15 may be determined by using the first regional gateway table RTAB1 (e.g. a globalGatewayTable of a routing.nds file). Consequently, the routing may be continued to one of said other update regions.

For example, a new motorway may be built between a location in the first update region and a location in the second (adjacent) update region. The new motorway may create a new gateway connecting the first update region with the second update region. The new gateway may be listed in the first regional gateway table RTAB1. Both update regions may be updated via binary diff to the memory MEM21. The navigation device 500 may be configured to calculate the route ROUTE21 from the first update region to the second update region by using the first regional gateway table RTAB1 such that also the new gateway is taken into consideration.

Consequently, it is not needed to update the global gateway table GTAB1 of the navigation database NDS stored in the navigation device 500. Routing between update regions may be possible without updating the global gateway table GTAB1, even after the update regions have been incrementally updated. In particular, it is not needed to update the global gateway table GTAB1 by using commands of the Structured Query Language (SQL)

The installation of a new update region and/or modifying a previous update region RID1 may require adding, replacing, and/or deleting gateways between update regions.

Each regional gateway table RTAB1, RTAB2 stored in the navigation device 500 may be associated with a version identifier. In particular, each regional gateway table RTAB1, RTAB2 stored in the navigation device 500 may be associated with a date. Routing from the first update region RID1 to the second update region RID2 may be performed by using the first regional gateway table RTAB1 of the first update region RID1 or by using the second regional gateway table RTAB2 of the second update region RID2. When calculating the route ROUTE12 from the first update region RID1 to the second update region RID2, the navigation device 500 may be configured to use the regional gateway table RTAB1, RTAB2 that has the newer version. the navigation device 500 may be configured to use the regional gateway table RTAB1, RTAB2 that has the latest date.

In an embodiment, an update package may also comprise the global gateway table GTAB1. The navigation device 500 may be configured to install a new update region, which may have an update region identifier N. The update region N may be transferred from an update database (UpdateDB) to the navigation database e.g. as an update package. A version number table ("BBlockCompVersionTable") may specify a first version number for the update region identifier N. The gateway table ("GlobalGatewayTable") contained in the update package may specify a second version number for the update region identifier N. The navigation device 500 may be configured to check whether the gateway table ("GlobalGatewayTable") has been changed by comparing the second version number with a first version number.

It is sometimes not possible to update the global gateway table GTAB1 by using SQL commands. If applying SQL updates, the system might have to rollback SQL changes in case of a system shut-down, etc. It may be advantageous to apply binary diff patches to the SQL files. It may be advantageous to apply binary diff patches to the SQL files without updating the database NDS via SQL. A navigational database may comprise e.g. more than 10 different update regions. Due to the high number of possible different combinations, it may be difficult or impossible to provide a predetermined binary patch, which would comprise a synchronized global gateway table GTAB1 matching with each possible combination.

In a full update, a complete product database may be exchanged, added or removed. In a partial update, an update region or a building block within a product database may be exchanged, added or removed. In an incremental update, versioned items smaller than update region or building block may be replaced, added or removed from the database. Incremental updates handle changes, like differences between quarterly map data releases and patches to the map data. In case of incremental update, versioned items within a product database may be changed by SQL transactions. These versioned items may be, for example, tiles, BLOBs or data records. An incremental update may comprise updating e.g. product database metadata, a shared data building block of the update region, building block data, metadata, and map content. Examples of versioned items are tiles, relational tables, columns, rows, and database records.

A versioned item may be e.g. a logical element of the navigation database such as country, region, or a point of interest (POI). A versioned item may also be e.g. a product database, an update region, a building block, a relational table, a column, a row, or a record. A versioned item may be updated as a whole in one update transaction in order to ensure consistency and structural integrity of an updated database. As versioned items can depend on other versioned items, updating one versioned item may require the update of a dependent versioned item.

An update distributor may split product database files into two or more update packages. An update package may contain update instructions, version information, and database files. An update package may be stored on an update medium, for example in a computer memory, in particular in a non-volatile memory card or in an external hard disk drive. An update package may be transferred to a device e.g. by using the Internet or a wireless communications network. An update application on a Human Machine Interface (HMI) may install one or more update packages so that files belonging to the update packages may be integrated in the navigation database NDS. One update region of a product database may be replaced. This kind of update may also be referred to as a regional update. For example, a device may comprise a product database for Europe, and an update region may correspond to the area of Germany. One or more update regions may be added to an existing product database e.g. in order to add new geographic region. The geographic area of a product database may be partitioned into two or more update regions. An update region may be a geographic area of a product database that may be subject to a regional update. Two or more adjacent update regions of a product database may overlap at defined points of their borders, i.e. at the so-called gateways. The interior of a first update region and the interior of a second update region are disjoint. An update region may contain one or more holes and/or one or more disconnected areas, for example, enclaves and exclaves. Update regions may cover different geographical areas. For example, a first update region may cover Germany, a second update region may cover Austria, a third update region may cover Switzerland. For example, a first update region may cover the West Coast of the USA, a second update region may cover the East Coast of the USA, and a third update region may cover the Middle West of the USA. Each update region may be updated (i.e. modified) independently from the other update regions in the product database. This may enable reliable routing through several update regions. An update region may be compiled and updated independently while maintaining connectivity.

When a change in the real world extend across a border between two update regions, the navigation database may keep its topological consistency even if only one update region is updated. It may still be possible after the update to determine a route from one update region to another via the location that has changed in the real world. A navigation device may be able to find an intersection at the start or end of a link also beyond the border. Likewise, it may be possible to find all route links that are connected to an intersection on the border.

A product database (PRODUCT.NDS) may contain a version table (versionTable) which may contain detailed version information about the versioned items included in said product database (PRODUCT.NDS). The version table (versionTable) may provide information about the version of a name (versionName), version of the compiler (compilerVersion), and time of creation (creationDateTime) associated with each version identifier (ID). The version table (versionTable) in the product database may apply to all versioned items in this product database.

Real-world objects relevant for a navigation system may represented by one or more features and may be represented on one or more levels. The real-world objects may be e g links, intersections, and road geometry lines. For example, road segments between two intersections may be represented by one or more links in a routing building block. A building block may use an identification scheme to uniquely identify a feature. Each feature may be associated with a unique identifier (ID). The identifier of a feature may be used to uniquely identify said feature in the routing building block. The intersection may be defined to be a point where two or more roads meet or cross, or where a road ends. An intersection may be represented in the database by an intersection feature in the routing building block.

A product database may contain a routing building block. The routing building block may be a core building block. The product database may comprise only one routing building block. The routing building block may comprise a topological representation of the road network. The topological representation may be suitable for calculating a route. Calculating a route may comprise determining a route from a given start position to a given destination position using the data structures of the routing building block. The routing building block may contain road geometry data suitable for mat matching. Map matching may comprise determining the map position of a navigation device from a raw position that is determined e.g. by a satellite navigation device. The map position may be determined by using a digital map represented in the routing building block.

Data stored in the routing building block may be partitioned on the basis of a global tiling scheme in order to simplify data storage. The geographical tiles may be rectangular in for optimal storing of geometrical data. To support route calculation, topological links do not need to be cut at tile borders of the tiles. A link describes a road segment between two intersections. A link may defined to be a road segment between two intersections, represented in the database by a link feature in the routing building block. The link may represent a road or a carriageway. Carriageways of a freeway or other dual-carriageway roads may be represented by a separate link for each carriageway. A link located on one tile only may be called e.g. as a base link A link extending over more than one tile may be called e.g. as a route link Route links may be supplemented with road geometry data, for example, for map matching, route guidance and map display. Road geometry may be implemented via road geometry line features. The road geometry of a route link may be clipped at the border of a tile, wherein the road geometry may be represented by individual road geometry line features. To access the geometry, references may be defined between a route link and all tiles where corresponding road geometry lines can be found. The routing building block may define references between routing features on different tiles. To enable the graphical representation of a route, references may be defined from route links in upper routing levels to their corresponding map lines in a basic map display building block. However, references are not always needed because routing functions and map display functions may share road network data that may be stored in the routing building block.

For example, the routing building block may define a reference from an intersection located in a first tile to a link located in a second tile. For example, the routing building block may define a reference from a road geometry line located in a first tile to a route link located in a second tile. The routing building block may further define references from routing features to name features, and references from routing features to basic map display features.

A name building block may provide name data for features of the routing building block. Names can be shared between different building blocks and can be maintained separately in the Name building block. Each feature of the Routing building block may be associated with a name stored in the Name building block, by using a reference.

For the person skilled in the art, it will be clear that modifications and variations of the devices and the methods according to the present invention are perceivable. The figures are schematic. The particular embodiments described above with reference to the accompanying drawings are illustrative only and not meant to limit the scope of the invention, which is defined by the appended claims.

The invention claimed is:

1. A method, comprising:
providing a first update region of a navigational database that comprises a plurality of update regions, wherein the first update region is configured to be modified independent of any modification of other update regions of the navigational database, and wherein the first update region includes at least portions of two or more tiles with at least one of the tiles forming a portion of both the first update region and another update region, and
providing a first gateway table of the first update region such that the first gateway table associates each gateway of the first update region with said first update region and also associates each gateway of the first update region with at least one other update region, wherein the first gateway table includes a record configured to associate a respective gateway of the first update region with the another update region and includes data indicating that all gateways of the first gateway table are associated with the first update region without including a record configured to individually associate the respective gateway with the first update region.

2. The method of claim 1, wherein gateway identifiers of the first gateway table are associated with the first update region.

3. The method of claim 1, comprising:
providing a second update region of a navigational database, and
providing a second gateway table of the second update region such that the second gateway table associates each gateway of the second update region with said second update region and with at least one other update region,
wherein the second gateway table is different from the first gateway table.

4. The method according to claim 1, comprising:
obtaining a global gateway table associating each gateway of the navigation database with an update region and with a tile,
selecting records from the global gateway table such that each selected record contains a gateway of the first update region, and
forming the first gateway table by adding the selected records to the first gateway table.

5. The method according to claim 4 comprising forming the first gateway table from the global gateway table by using Structured Query Language.

6. The method according to claim 1 comprising:
providing a new gateway of the first update region, and
forming the first gateway table by adding a record to the first gateway table such that the record associates the new gateway of the first update region with said first update region and with at least one other update region.

7. The method according to claim 1 comprising:
transferring the first update region to a memory of a navigation device.

8. The method according to claim 1 comprising:
calculating a route from a first location of the first update region to a second location of a second update region by using the first update region, by using a second update region, and by using the first gateway table.

9. An apparatus comprising at least one processor, and a memory including computer program code, the memory and the computer program code being configured to, with the at least one processor, cause the apparatus to perform at least the following:
form a first gateway table of a first update region of a navigational database that comprises a plurality of update regions, wherein the first update region is configured to be modified independent of any modification of other update regions of the navigational database, wherein the first update region includes at least portions of two or more tiles with at least one of the tiles forming a portion of both the first update region and another update region, and wherein the apparatus caused to form the first gateway table by including data indicating that all gateways of the first gateway table are associated with the first update region without including a record configured to individually associate the respective gateway with the first update region and also by adding a record to the first gateway table that associates a respective gateway of the first update region with the another update region,
wherein gateway identifiers of the first gateway table are associated with the first update region.

10. An apparatus comprising at least one processor, and a memory including computer program code, the memory and the computer program code being configured to, with the at least one processor, cause the apparatus to perform at least the following:
obtain a global gateway table associating each of a plurality of gateways of the navigation database with an update region and with a tile, wherein the global gateway table includes a plurality of records for the plurality of gateways with one or more of the plurality of records associated with each of a plurality of update regions of a navigational database, wherein the first update region is configured to be modified independent of any modification of other update regions of the navigational database, and wherein the first update region includes at least portions of two or more tiles with at least one of the tiles forming a portion of both the first update region and another update region,
select records from the global gateway table such that each selected record contains a gateway of the first update region, and
form a first gateway table by adding the selected records to the first gateway table, wherein the first gateway table includes a record selected from the global gateway table that associates a respective gateway of the first update region with the another update region and also includes data indicating that all gateways of the first gateway table are associated with the first update region without including a record configured to individually associate the respective gateway with the first update region.

11. An apparatus comprising at least one processor, and a memory including computer program code, the memory and the computer program code being configured to, with the at least one processor, cause the apparatus to perform at least the following:
receive a first update region of a navigational database that comprises a plurality of update regions, wherein the first update region is configured to be modified independent of any modification of other update regions of the navigational database, and wherein the first update region includes at least portions of two or more tiles with at least one of the tiles forming a portion of both the first update region and another update region,
receive a first gateway table of the first update region that includes a record that associates a respective gateway of the first update region with the another update region, wherein the first gateway table also includes data indicating that all gateways of the first gateway table are associated with the first update region without including a record configured to individually associate the respective gateway with the first update region, and
calculate a route from a first location of the first update region to a second location of the another update region by using the first update region, by using the another update region, and by using the first gateway table.

12. An apparatus, comprising:
a navigational database comprising a plurality of update regions including a first update region, wherein the first update region is configured to be modified independent of any modification of other update regions of the navigational database, and wherein the first update region includes at least portions of two or more tiles with at least one of the tiles forming a portion of both the first update region and another update region, and a memory storing a first gateway table of the first update region such that the first gateway table associates each gateway of the first update region with said first update region and also associates each gateway of the first update region with at least one other update region, wherein the first gateway table includes a record configured to associate a respective gateway of the first update region with the another update region and includes data indicating that all gateways of the first gateway table are associated with the first update region without including a record configured to individually associate the respective gateway with the first update region, wherein gateway identifiers of the first gateway table are associated with the first update region.

13. An apparatus for providing a gateway table, comprising:

means for providing a first update region of a navigational database that comprises a plurality of update regions, wherein the first update region is configured to be modified independent of any modification of other update regions of the navigational database, and wherein the first update region includes at least portions of two or more tiles with at least one of the tiles forming a portion of both the first update region and another update region, and means for providing a first gateway table of the first update region such that the first gateway table associates each gateway of the first update region with said first update region and also associates each gateway of the first update region with at least one other update region, wherein the first gateway table includes a record configured to associate a respective gateway of the first update region with the another update region and includes data indicating that all gateways of the first gateway table are associated with the first update region without including a record configured to individually associate the respective gateway with the first update region.

14. The apparatus far providing a gateway table according to claim 13, wherein the means for providing the first gateway table are configured to provide the first gateway table such that gateway identifiers of the first gateway table are associated with the first update region.

15. The apparatus for providing a gateway table according to claim 13, wherein the means for providing the first gateway table are configured to form the first gateway table from a global gateway table by using Structured Query Language.

* * * * *